United States Patent [19]
Atkins et al.

[11] 3,786,260
[45] Jan. 15, 1974

[54] RADIATION ABSORBING SHIELD FOR PERSONNEL AND MATERIALS AND METHOD OF MAKING SAME

[75] Inventors: Bobby Leroy Atkins; Robert Niles Bashaw, both of Lake Jackson, Tex.

[73] Assignee: The Dow Chemical Company, Midland, Mich.

[22] Filed: Dec. 30, 1971

[21] Appl. No.: 214,394

[52] U.S. Cl. .......................................... 250/108 WS
[51] Int. Cl. ............................................... G21f 1/00
[58] Field of Search .................. 250/83 CD, 108 R, 250/108 WS; 313/61 D; 252/478

[56] References Cited
UNITED STATES PATENTS
3,450,878   6/1969   Pezdirtz et al. ................ 250/83 CD Primary Examiner—James W. Lawrence
Assistant Examiner—Davis L. Willis
Attorney—William M. Yates et al.

[57] ABSTRACT

A radiation absorbing shield is constructed by forming continuous phase gelled aqueous solution, containing suitable dissolved radiation absorbing metal salts between confining walls which may be transparent. This is accomplished by mixing an aqueous solution of a polymerizable monomer, e.g., acrylamide, and an aqueous solution containing a catalyst, e.g., a redox type such as $K_2S_2O_8$-$Na_2S_2O_5$, and a crosslinking agent, e.g., N, N-methylene bisacrylamide or other divinyl monomer. Alternatively a radiation source can be used in place of the free radical and crosslinking monomer solution to accomplish the polymerizing and crosslinking of the monomer.

12 Claims, No Drawings

RADIATION ABSORBING SHIELD FOR PERSONNEL AND MATERIALS AND METHOD OF MAKING SAME

BACKGROUND OF THE INVENTION

In working with radioactive material it is necessary to shield personnel and certain susceptible materials from the harmful effects of radiation. In the case of radioactive materials which emit neutrons it has been the practice to use hydrocarbon polymers and compounds, e.g., polyethylene, oils, and the like, which have a high absorbency for the neutrons. In many situations the hydrocarbons are undesirable because of the necessity of maintaining fire resistance in the facility since heat is evolved along with radiation emissions.

It has been the practice to use large volumes of water within confining walls, frequently in walls of glass or transparent plastic materials, since water is an inexpensive as well as efficient neutron absorber and has the added ability to absorb heat and is also resistant to fire. One disadvantage is that the weight and consequent pressure of such large volumes of water makes the sealing of joints at the corners and edges of the walls difficult. Leaking is common, particularly after exposure of sealing materials which degrade under the influence of radiation. Another disadvantage associated with the leaking water is that, for example, if plutonium is the material being shielded, water will react violently with it to cause fires if they should contact one another.

Thus, it would be highly desirable to prevent the water from leaking by immobilizing it. A known way to immobilize water is to gel it with a gelling agent. Gelling agents such as natural gums, synthetic polymers, e.g., polyacrylic acid, polyacrylamide, polyvinyl pyrrolidone, and the like could be used. One of the requirements is that the gelling agent be able to gel aqueous solutions which contain appreciable concentrations, e.g., 10–70%, of metal salts which augment the absorptive ability of water itself. This limits the selection of a gelling agent since all gelling agents do not gel salt solutions and some are quite sensitive to even low concentrations of ions. Crosslinked polyvinyl pyrrolidone and crosslinked polyacrylamide are gelling agents which can be used. These polymeric gelling agents are particulate and even when in the gelled state remain particulate swollen entities, each individual particle becoming larger by virtue of its having absorbed water. A disadvantage of the particulate gels is that the particles are mobile with respect to one another and flow readily, as sand and other similar particulate materials do.

Another disadvantage is that during the mixing of particulate polymer with the water or aqueous solutions to gel them, air bubbles are frequently occluded and entrapped between the gelled particles. This makes for discontinuity in the absorbing layer and a path for the radiation to travel.

DESCRIPTION OF THE INVENTION

It has now been discovered that the aqueous solutions can be immobilized by gelling them in situ. Thus, we have discovered, in preparing a wall segment containing a hollow section filled with water as the principal radiation absorber, the improvement which consists essentially of mixing (1) an aqueous solution of a polymerizable, water-soluble vinyl monomer containing an activator, e.g., an iron salt, and a crosslinker, e.g., a water soluble divinyl monomer with (2) an aqueous solution of a free radical producing catalyst, e.g., a redox catalyst system. The polymerization thus initiated produces a firm body of gel which is stable for long periods of time under the influence of radiation.

An alternate method of producing the gel is to irradiate the solution of polymerizable vinyl monomer in which case the radiation provides the free-radical initiation of the polymerization and subsequently is also crosslinked thereby. Optionally, the divinyl crosslinking agent may be used in conjunction with a lesser amount of radiation, in which case the radiation acts only as the initiator of the polymerization.

As used herein, the term "water-soluble vinyl monomer" refers to any monomer containing vinyl unsaturation which is soluble in water at the concentration employed and which, if it were not for crosslinking, would form a polymer which is soluble in water at the concentration employed. Suitable monomers include acrylamide, methacrylamide, acrylic acid, methacrylic acid, monovalent acrylate and methacrylate salts, sodiosulfoethyl (meth) acrylate, hydroxyalkyl acrylates, copolymers of acrylamide and acrylate salts, vinyl pyrrolidone, sodium styrene sulfonate and the like, as well as mixtures thereof.

The crosslinked polymers enumerated above are stable in the presence of dissolved salts and to continuous radiation over long periods of time, e.g., several years.

The water-soluble vinyl monomer is admixed with water or, preferably, with a mixture or water and a water-soluble glycol. In general, an aqueous solution of the water-soluble vinyl monomer is employed which contains from about 2 to about 50 wt. percent, preferably from about 5 to about 15 weight percent, monomer based on the total weight of the gel. A water-soluble glycol may be employed to replace a substantial portion of the water and it is generally preferred to employ from about 10 to about 50 weight percent glycol based on the weight of the total gel. As much as 65–70 percent glycol may be used. The use of a glycol to replace a portion of the aqueous phase not only reduces the freezing point of the gel, but improves the clarity of the final gel. Ethylene glycol has been found to be particularly suitable.

A water-soluble cross-linking agent is employed to provided a sufficient cross-link density in the vinyl polymer to cause said polymer to form a gel with water. Suitable cross-linking agents include water-soluble alkylidene bias-acrylamides such as N,N'-methylenebisacrylamide, and other water-soluble divinyl compounds such as divinyl ether of diethylene glycol or polyvinyl compounds such as acrylate esters of polyols, e.g., polyethylene glycols, diglycerin and the like. Other suitable alkylidene bis-acrylamide compounds are shown in U.S. Pat. No. 3,046,201 to White, et al. The term water-soluble when used with regard to the crosslinking agent means that such crosslinking agent will form a clear solution in the polymerizable aqueous mixture at the concentration employed. The proportion of crosslinking agent to be employed is dependent on the crosslinking density desired and on the monomer concentration employed. A more dilute vinyl monomer solution requires more crosslinker to achieve the same gel properties than does a more concentrated monomer solution. In general, however, from about 0.01 to about 10 weight percent, preferably from about 0.2 to about 2 percent crosslinker is employed, based on the vinyl monomer present. If too little crosslinker is employed, the gel is thin and soft and will tend to flow and will not provide support for the suspended materials. If too much crosslinker is employed, the gel becomes brittle and loses cohesiveness or forms insoluble particles which precipitate from solution and cloud the gel. Therefore, sufficient crosslinker is employed to provide a gel of the desired consistency without becoming brittle and fragile or producing insoluble particles.

Polymerization of the above-described system is produced by employing a free radical producing catalyst. Since it is desirable in most instances that the polymerization take place at or near room temperature, it is therefore desirable that the catalyst or catalyst system employed be capable of producing sufficient free radicals to initiate polymerization at or near room temperature. Suitable free radical producing catalysts include ionizing radiation such as gamma rays, beta rays, or ultraviolet irradiation, redox catalyst systems such as the mixture of an alkali metal persulfate, and an alkali metal bisulfite activated with a soluble salt of a polyvalent metal such as $FeSO_4$. Substantially any of the known water-soluble, free-radical producing redox catalyst systems may be employed in the process of this invention but the catalyst composed of $K_2S_2O_8$ and $Na_2S_2O_5$ activated with $FeSO_4$ has been found particularly effective. Still better results are achieved if the redox catalyst system is additionally activated with a hydroperoxide such as tertiary butyl hydroperoxide. This permits lower activation temperatures, more rapid polymerization and additionally removes any color contained within the gel due to the presence of materials such as iron salts.

When radiation is used to initiate the polymerization, a dose of ionizing radiation of from about 0.001 to about 50 megarads is required. If it is desired to also crosslink by means of radiation, a total of does of from about 0.01 to about 50 megarads is required. The particular dose required is dependent upon the particular monomer or monomers being used, their concentration in solution, their being free of inhibitors, the dose rate used, and the type of radiation.

GENERAL DESCRIPTION OF THE PROCESS

In a general procedure for carrying out the invention, to the water or a water-glycol solution containing the radiation absorbing metal salt, e.g., $NaBO_2$, and an iron salt (activator) is added the vinyl monomer and the divinyl crosslinking agent. To this is added, simultaneously, aqueous solutions which comprise the free-radical catalyst system, e.g., solutions of $K_2S_2O_8$, $Na_2S_2O_5$ and tert-butylhydroperoxide. These solutions are thoroughly mixed and the polymerization proceeds rapidly. The rate of reaction is dependent upon the amount and type of catalyst, the amounts and types of divinyl crosslinker and monomer present and the temperature, which parameters are known to the art-skilled. It also depends to some extent on the concentration of the radiation absorbing salt.

The following examples are representative of the invention.

EXAMPLE 1

A solution of 1180 g. of ethylene glycol, 1180 g. acrylamide and 9,440 ml. deionized water were mixed and filtered twice. To this solution was added 118 ml. of 0.1% $FeSO_4·7H_2O$ aqueous solution, and 944 ml. of 2.0% methylene bisacrylamide (MBA) aqueous solution. The solutions were mixed thoroughly and poured into a plastic box 24 inches × 24 inches × 2 inches. In order to prevent the exotherm from becoming too great, the above quantity was divided into four equal volumes and polymerized one after the other. Thus, each succeeding polymerization was carried out on top of the previously polymerized portion and each layer was integrally associated with the adjacent layer, forming one large gelled mass of aqueous solution.

For each 2,800 ml of the above solution, 118 ml. each of 1% aqueous solutions of $K_2S_2O_8$ and $Na_2S_2O_5$ and 29.5 ml. of a 1% aqueous solution of tert-butyl hydroperoxide (TBHP) were used. These three solutions were added simultaneously to the solution containing monomer and crosslinker.

The solutions were thoroughly mixed and polymerization proceeded rapidly with evolution of considerable heat. The top of the box was covered with a stainless steel cover which lapped over and down the sides. A silicone rubber was used to seal the top of the box to prevent evaporation of the gelled water.

While a plastic box, or wall segment, can be used, the more usual practice is to use a glass-walled section with metal channels joining the edges of the glass plates. The following example is illustrative:

EXAMPLE 2

Using 1/4 inch plate glass, a window, or wall segment, was constructed using three panels of glass, each 24 inches × 24 inches, which were set parallel to one another in aluminum channels on three of their edges, leaving one side open. This provided a two compartment box with two side panels and a parallel central panel of glass and three sides of aluminum channel. The glass edges were sealed into the aluminum channel using silicone rubber. Each compartment had a volume of about 6.35 liters. This box was filled with gelled water in the same manner as Example 1 above.

EXAMPLE 3

In order to demonstrate that the polymerization can be accomplished in an aqueous solution containing dissolved salts, especially those capable of absorbing radiation, the following experiment was conducted.

A monomer system was prepared as follows: 100 g. of dry acrylamide and 100 g. ethylene glycol were dissolved in 800 ml deionized $H_2O$ and filtered twice. Solutions were prepared containing 2% N,N'-methylene bisacrylamide (MBA), 1% $K_2S_2O_8$, 1% $Na_2S_2O_5$ and 1% t-butyl hydroperoxide, each dissolved in a mixture of 10% ethylene glycol and 90% deionized water. Another solution was prepared of 0.1% $FeSO_4$ in water.

A control and a sample containing 2.50 g. borax ($Na_2B_4O_7·10 H_2O$) dissolved in 50 ml monomer were polymerized separately according to the following procedure.

50 ml of monomer (acrylamide)
4.0 ml 2% MBA
0.5 ml 0.1% $FeSO_4·7H_2O$ soln.
2.0 ml. $K_2S_2O_8$ soln.
2.0 ml. $Na_2S_2O_5$ soln.
0.5 ml TBHP soln.

The control began polymerizing slowly after about 2 ½ minutes and soon set to a clear rigid gel.

The mixture containing the borax started polymerizing after 3 or 4 minutes. It proceeded slowly and as the polymerization progressed the solution, which had been hazy, cleared. After about 30 minutes it had cooled back to room temperature and a very tough resilient gel which had a very light amber color resulted. The clarity was good, with no bubbles or striations. The gel appeared "tougher" than the control.

EXAMPLE 4

A transparent solution having a grayish cast was prepared by dissolving 80 g. of $ZnBr_2$ in 20 g. of water. The density of this solution was 2.5 g./cc. 45 g. of this solution was used to dissolve 5 g. of crystalline acrylamide.

This monomer solution was irradiated with gamma rays from a $Co^{60}$ source for one hour at a dose rate of 0.08 megarads per hour. The result was a firm transparent gel.

EXAMPLE 5

Example 4 was repeated using 5% by weight acrylamide dissolved in a 70% $ZnCl_2$ – 30% water solution. The resultant transparent firm gel had a density of 2.0 g. per cc.

EXAMPLE 6

The following solutions were prepared:
(1) 22 g. of acrylamide was dissolved in 100 g. of a solution of 70% $ZnCl_2$ – 30% $H_2O$.
(2) 0.2 g. of N,N'-methylene bisacrylamide was dissolved in 50 g. of solution of 70% $ZnCl_2$ – 30% $H_2O$.
(3) 0.1 g. of sodium metabisulfite was dissolved in 25 g. of 70% $ZnCl_2$ – 30% water solution.
(4) 0.1 g. of potassium persulfate dissolved in 2 g. of water and then mixed into 25 g. of a 70% $ZnCl_2$ – 30% water solution.

Solutions 1 and 2 were mixed and evacuated to remove the dissolved air. Then solution 3 was mixed in followed by solution 4. After solution 4 was added, the mix set into a gel within 9 seconds. The gel was very warm due to the exotherm during the polymerization. The resultant product was a transparent firm gel.

EXAMPLE 7

Example 6 was repeated using 320 g. of 70% $ZnCl_2$ – 30% water solution instead of 100 g. in solution (1). This mixture set into a firm transparent gel in about 45 seconds. It was felt this mixture was the easiest to handle and had the best optical clarity.

EXAMPLE 8

The container of gelled water prepared in Example 1 above was placed in a radiation chamber and exposed to gamma radiation. The total dose at the end of the experiment was $5.7 \times 10^7$ rads and the polymer had not changed in physical properties with the exception of a very slight yellow discoloration. The gel was also slightly more susceptible to being broken up with a rod than was the same non-irradiated gel.

EXAMPLE 9

A test to see the effects of freezing and thawing on a small sample gel formation was made. This sample was prepared previously in a 4 inches diameter styrene box. This was prepared from 213 ml of monomer (10% acrylamide – 10% ethylene glycol in $H_2O$ – 200 ml, 8.0 ml 2% MBA soln., 2.0 ml of 0.1% $FeSO_4 \cdot 7H_2O$ soln. and 3.0 ml formaldehyde).

This was polymerized by adding simultaneously 8.0 ml of 1% $K_2S_2O_b$, 8.0 ml of 1% $Na_2S_2O_5$ and 2.0 ml. of 1% TBHP.

About 220.5 g. of gel was tested. A clear polystyrene cover was placed over the gel (about 3/4 inch void present) and was sealed on with plastic tape. The sample was placed (cover up) in the deep freeze at $-20°$ C for 4 hours.

After 4 hours the gel was frozen solid and an opaque white in color. It thawed very slowly at room temperature and droplets of $H_2O$ formed on the cover (still upright). While still partially frozen approximately 5 or 6 ml of water as free liquid was observed to be present on the surface of the gel and the plastic. When completely thawed and at room temp. there was essentially no free liquid. The cover was removed and the container weighed the same 252 grams. The gel was clear with slight "marbeling" at the upper surface. The optics were still good.

The cover was sealed back on and it was placed in the deep freeze for an extended test. It was removed from the freezer after 116 hours. Again the gel was frozen solid and opaque. This time however, a ridge of frozen gel was noticed on the surface and ice crystals were very noticeable in the gel. The sample was allowed to warm slowly. Again free liquid was noted. This time the container was opened and this liquid removed. The gel had lost 8.0 g. of water at this point. Also the resulting gel was very marbled with small tears and voids internally. It also pulled away from the container walls at the top. The optics were poorer, but seemed to improve with time. The gel was noticeably clearer 20 hours after thawing than immediately after thawing. The sample was observed for several more days. No additional free liquid was noted.

EXAMPLE 10

Preparation of Monomer:

22.7 kg dry grade acrylamide was dissolved in 181.6 kg deionized $H_2O$ and 22.7 kg low conductivity grade ethylene glycol along with 370 g. N,n'-methylene bisacrylamide and 4.0 g. $FeSO_4 \cdot 7H_2O$. When dissolved and mixed this was pumped consecutively through a 100 micron and a 10 micron filter into a vacuum tank. A vacuum of about 740 mm Hg was pulled for 3 ½ hours. The vacuum was released and 190.7 kg of the monomer solution was pumped into a 55-gallon drum. A quantity of 2.27 kg of 37% aqueous formaldehyde was added to the 55-gallon drum of monomer just before using.

Preparation of Catalysts:

Catalysts were prepared as follows:
64 g. $K_2S_2O_8$ dissolved in 6,340 ml deionized $H_2O$ (1%).
64 g. $Na_2S_2O_5$ dissolved in 6,340 ml deionized $H_2O$ (1%)

The container to be filled was a double walled stainless steel glove box. The walls were spaced 2 inches apart. The box was of complex design with two large holes for viewing windows. It had four ports for gloves, one access door and a round filter housing. The interior was washed several times with water and the volume determined to be approximately 265 liters.

The demand mixing device was set up and flows set for 18.95 l./min. of monomer and 758 ml/min. of each catalyst (25:1 monomer to each catalyst). The tank was filled from the bottom of one end with the opposite end elevated. The first shot lasted approximately 11 ½ minutes with flows dropping slightly. By use of small holes it was determined that the baffled interior was adequately filled. The remaining volume on the top was filled the next day using freshly prepared batches of monomer and catalysts of the same concentrations as above. The shot was made from the top this time at the lower end and run over at the elevated end. When the gel was set, polyethylene and stainless steel plugs were used to seal the vents. The small door was filled at this time also.

Water soluble salts capable of absorbing various kinds of radiation can be employed. When water or hydrocarbons are used as shielding for neutrons, secondary radiation particles are emitted. These require additional shielding such as is provided by the addition of the salts indicated above and enumerated and exemplified.

Salts which are useful to shield against gamma radiation are the salts of heavy metals, e.g., Cd, W, Pb and the like, or any salts which increase the density of the medium. Other salts for absorbing other radioactive emissions are known to those skilled in the art.

While not necessary to the polymerization itself, it is desirable to include compounds which act to inhibit fungi and bacterial growth. Formaldehyde, as shown in Example 9 above, is satisfactory for this purpose. Other compounds useful for this purpose are the 1,3-dichloropropene salt of hexamethylene-tetramine, calcium propionate, acetaldehyde and the like. Others known to the art can be used providing they are compatible with the system. The inhibitor compounds are unnecessary when the system is completely sterile either because of its preparation or because of the type and intensity of radiation being used. Sometimes the salts used for absorbing radiation are also inhibitors for fungi and bacteria.

We claim:

1. A radiation shield comprising a wall segment having a hollow section which is filled with water as the principal radiation absorber wherein said water contains a crosslinked polymer of a water soluble vinyl monomer whereby said water is immobilized.

2. The article of claim 1 wherein the water additionally contains a radiation absorbing salt.

3. The article of claim 2 wherein the salt is present at about 4 to 85 percent based on the total weight of aqueous solution.

4. The article of claim 2 wherein the crosslinked polymer is a polymer of acrylamide and N,N'-methylenebisacrylamide.

5. The article of claim 2 wherein the radiation absorbing salt is a compound of boron.

6. The article of claim 5 wherein the compound of boron is $NaBO_2$, $Na_2B_4O_7$, $K_2B_2O_4$ or $NH_4HB_4O_7$.

7. A process for making a radiation shield which comprises providing a box-like confining vessel placing in said vessel aqueous solutions of (1) a polymerizable water soluble monomer containing an activator and a crosslinking divinyl monomer and (2) a free radical producing catalyst to polymerize said monomers to form in situ a gelled aqueous solution.

8. The process of claim 7 wherein the confining vessel has at least two transparent sides.

9. The process of claim 7 wherein the aqueous solution of polymerizable monomer contains a radiation absorbing salt.

10. The process of claim 9 wherein the radiation absorbing salt is $ZnCl_2$ or $ZnBr_2$.

11. The process of claim 9 wherein the radiation absorbing salt is a compound of boron.

12. A radiation shield comprising a box-like confining vessel containing an aqueous solution gelled, or immobilized, with a crosslinked polymer of a water soluble vinyl monomer and a water so'uble divinyl monomer, and containing a radiation absorbing salt dissolved therein.

* * * * *

PO-1050
(5/69)

UNITED STATES PATENT OFFICE
CERTIFICATE OF CORRECTION

Patent No. 3,786,260        Dated Jan. 15, 1974

Inventor(s) Bobby Leroy Atkins; Robert Niles Bashaw

It is certified that error appears in the above-identified patent and that said Letters Patent are hereby corrected as shown below:

Col. 2, line 30, "with a mixture or water" should be --with a mixture of water--.

Col. 2, line 49, "bias-acrylamides" should be --bis acrylamides--.

Col. 5, line 61, "1% $K_2S_2O_b$, 8.0 ml" should be --1% $K_2S_2O_8$, 8.0 ml--.

Col. 8, line 32, "so'uble" should be --soluble--.

Signed and sealed this 4th day of March 1975.

(SEAL)
Attest:

RUTH C. MASON
Attesting Officer

C. MARSHALL DANN
Commissioner of Patents
and Trademarks